United States Patent
Shemper et al.

(10) Patent No.: US 11,434,369 B2
(45) Date of Patent: Sep. 6, 2022

(54) GLASS-FILLED POLYMER COMPOSITION COMPRISING A POLY(ARYL ETHER SULFONE), A POLY(ARYL ETHER KETONE), AT LEAST ONE POLYPHENYLENE SULFIDE AND GLASS FIBERS

(71) Applicant: SOLVAY SPECIALTY POLYMERS USA, LLC, Alpharetta, GA (US)

(72) Inventors: Bianca Sadicoff Shemper, Hattiesburg, MS (US); Jiqiang Xia, Dublin, OH (US); Christopher Ward, Sandy Springs, GA (US)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 60 days.

(21) Appl. No.: 16/640,841

(22) PCT Filed: Aug. 27, 2018

(86) PCT No.: PCT/EP2018/073052
§ 371 (c)(1),
(2) Date: Feb. 21, 2020

(87) PCT Pub. No.: WO2019/042949
PCT Pub. Date: Mar. 7, 2019

(65) Prior Publication Data
US 2021/0163741 A1    Jun. 3, 2021

Related U.S. Application Data

(60) Provisional application No. 62/550,816, filed on Aug. 28, 2017.

(30) Foreign Application Priority Data
Dec. 14, 2017  (EP) .................................... 17207184

(51) Int. Cl.
*C08L 81/06* (2006.01)
*C08L 71/10* (2006.01)
*C08L 81/04* (2006.01)
*C08K 3/40* (2006.01)
*C08K 7/14* (2006.01)

(52) U.S. Cl.
CPC .............. *C08L 81/06* (2013.01); *C08L 71/10* (2013.01); *C08L 81/04* (2013.01); *C08K 3/40* (2013.01); *C08K 7/14* (2013.01)

(58) Field of Classification Search
CPC .......... C08L 81/06; C08L 81/04; C08L 71/10; C08K 7/14
See application file for complete search history.

(56) References Cited

U.S. PATENT DOCUMENTS 4,108,837 A    8/1978  Johnson et al.
4,175,175 A    11/1979 Johnson et al.

FOREIGN PATENT DOCUMENTS

| EP | 0382409 A2 | 8/1990 | |
| EP | 2738219 A1 * | 6/2014 | ......... C08G 65/4012 |
| EP | 2738219 A1 | 6/2014 | |
| WO | 0109248 A1 | 2/2001 | |
| WO | 2013092628 A1 | 6/2013 | |
| WO | 2014177392 A1 | 11/2014 | |
| WO | 2016102330 A1 | 6/2016 | |
| WO | WO-2016102330 A1 * | 6/2016 | ............. C08G 65/00 |
| WO | WO 2019/042948 A1 | 3/2019 | |

OTHER PUBLICATIONS

Hausrath R. L. et al., "Fiberglass and Glass Technology", 2010, XIV, Chapters, pp. 197-225, F.T. Wallenberger and P.A. Bingham (eds.).

* cited by examiner

*Primary Examiner* — Robert D Harlan
(74) *Attorney, Agent, or Firm* — Beatrice C. Ortego

(57) ABSTRACT

The present invention relates to high performance polymer compositions and articles made therefrom. In particular, the present invention relates to compositions (C1) comprising from 25 to 59 wt. % of at least one poly(aryl ether sulfone) (PAES), from 1 to 35 wt. % of at least one poly(aryl ether ketone) (PAEK), from 20 to 35 wt. % at least one polyphenylene sulfide (PPS), and from 5 to 50 wt. % of glass fibers, the wt. % being based on the total weight of the polymer composition (C1).

18 Claims, No Drawings

GLASS-FILLED POLYMER COMPOSITION COMPRISING A POLY(ARYL ETHER SULFONE), A POLY(ARYL ETHER KETONE), AT LEAST ONE POLYPHENYLENE SULFIDE AND GLASS FIBERS

RELATED APPLICATIONS

This application is a U.S. national stage entry under 35 U.S.C. § 371 of International Application No. PCT/EP2018/073052 filed Aug. 27, 2018, which claims priority to U.S. provisional patent application No. 62/550,816, filed on Aug. 28, 2017 and to European patent application No. 17207184.7, filed on Dec. 14, 2017, the whole content of each of these applications being incorporated herein by reference for all purposes.

TECHNICAL FIELD

The present invention relates to high performance polymer compositions and articles made therefrom. In particular, the present invention relates to compositions comprising at least one poly(aryl ether sulfone) (PAES), at least one poly(aryl ether ketone) (PAEK), at least one polyphenylene sulfide (PPS), and glass fibers.

BACKGROUND ART

Polymer compositions having high melt flow are advantageous in numerous applications and manufacturing techniques. For example, high melt flow polymers are necessary for injection molding of shaped articles with thin parts, in thermoplastic continuous fiber (glass, carbon, aramide) composites and in additive manufacturing methods where more viscous polymers would be unsuitable because. In some such applications, for example, structural components for mobile electronic devices, it may be necessary to produce thin structures having a thickness less than 10 mm, less than 5 mm, less than 3 mm, or even less than 1 mm. Moreover, in additive manufacturing methods such as fused filament fabrication (FFF) and selective laser sintering (SLS), high melt flow is essential for adequate deposition and spreading of successive layers of polymer in the printing process.

Polysulfone (PSU) is a high temperature amorphous thermoplastic resin with a glass transition temperature (Tg) above 180° C. PSU was commercially introduced in 1965 by the Union Carbide Corporation and presents the following chemical structure:

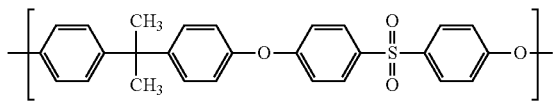

PSU is nowadays available as Udel® PSU from Solvay Specialty Polymers USA, L.L.C.

Glass-filed polysulfone compositions are used in many applications, such as plumbing, commercial aircraft interiors, cookware, wire insulation and food service articles, for their valuable mechanical properties, notably strength, stiffness and impact resistance over temperatures ranging from about −100° C. to 150° C.

Despites many valuable properties, a need still exists for PSU compositions that have a lower melt viscosity, especially when including reinforcing fillers, without compromising the mechanical performances of the polymer.

The present invention is directed to a glass-filed polymer composition comprising a poly(aryl ether sulfone) (PAES), for example PSU, PPSU or PES, as the main polymer component, as well as two other aromatic polymers, namely poly(ether ether ketone) (PEEK) and polyphenylene sulfide (PPS).

Several documents describe compositions made of ternary polymer blends, having valuable properties.

WO 01/09248 A1 (Solvay) describes a ternary resin blend comprising poly(biphenyl ether sulfone) (PPSU), poly(ether sulfone) (PES) and polysulfone (PSU). Articles made from the ternary blend can be steam-sterilized repeatedly without stress cracking and have good chemical resistance which makes it for example useful in medical applications.

WO 2013/092628 A1 (Solvay) relates to another ternary polymer blend comprising polyaryletherketone (PAEK), poly(biphenyl ether sulfone) (PPSU), polysulfone (PSU) and glass fibers having an elastic modulus of at least 76 GPa as measured according to ASTM D2343. Polymer composition is very well suited for the manufacture of articles useful in areas as various as plumbing and electronics.

WO 2016/102330 A1 (Solvay) relates to a composition comprising at least one poly(aryl ether ketone) (PAEK), at least one poly(biphenyl ether sulfone) (PPSU), at least one polyethersulfone (PES) polymer, and at least one reinforcing filler. This ternary composition has a low melt viscosity poly(aryl ether ketone) (PAEK) compositions with improved mechanical properties such as strength and toughness.

None of these documents however describe glass-filed polymer composition comprising PAES (as the main polymer component), poly(ether ether ketone) (PEEK) and polyphenylene sulfide (PPS), with a high melt flow, without compromising the mechanical performances of the PAES polymer, making the composition well-suited notably for injection molding of shaped articles with thin parts or for additive manufacturing.

SUMMARY OF INVENTION

The present invention relates to a polymer composition (C1) comprising:
  from 25 to 59 wt. % of at least one poly(aryl ether sulfone) (PAES), for example one polysulfone (PSU);
  from 1 to 35 wt. % of at least one poly(aryletherketone) (PAEK), for example from 1 to 15 wt. % of at least one PAEK, wherein the PAEK is preferably poly(ether ether ketone) (PEEK);
  from 20 to 35 wt. % of at least one polyphenylsulfide (PPS); and
  from 5 to 50 wt. % of glass fibers,
based on the total weight of the polymer composition (C1).

The present invention also relates to articles comprising the polymer composition (C1), for example selected from the group consisting of a pipe, a fitting, a manifold, a valve, a medical instrument or part of instrument, a medical case or tray, an aircraft interior component, a cookware, a laboratory animal cage, a laboratory equipment, and a structural part of an electronic device.

The present invention finally relates to the use of a blend of at least one poly(aryl ether ketone) (PAEK) and at least one polyphenylsulfide (PPS) as a flow enhancer of a polymer composition (C2) comprising at least one polysulfone (PSU) and glass fibers.

DETAILED DESCRIPTION OF THE INVENTION

Described herein are polymer compositions (C1) comprising:
- from 25 to 59 wt. % of at least one poly(aryl ether sulfone) (PAES);
- from 1 to 35 wt. % of at least one poly(aryl ether ketone) (PAEK);
- from 20 to 35 wt. % of at least one polyphenylsulfide (PPS); and
- from 5 to 50 wt. % of glass fibers, based on the total weight of the polymer composition (C1).

The polymer compositions of the present invention comprise at least three polymers and glass fibers. In some embodiments, the polymer composition may, for example, consist essentially of three, four or five polymers and glass fibers.

The polymer compositions of the present invention have a high melt flow in comparison to compositions comprising PSU and glass fibers or compositions comprising two polymers (for example PSU+PEEK or PSU+PPS). The polymer compositions also have improved tensile strength, tensile elongation and unnotched impact resistance in comparison to compositions comprising PSU and glass fibers.

In the present application:
- any description, even though described in relation to a specific embodiment, is applicable to and interchangeable with other embodiments of the present invention;
- where an element or component is said to be included in and/or selected from a list of recited elements or components, it should be understood that in related embodiments explicitly contemplated here, the element or component can also be any one of the individual recited elements or components, or can also be selected from a group consisting of any two or more of the explicitly listed elements or components; any element or component recited in a list of elements or components may be omitted from such list; and
- any recitation herein of numerical ranges by endpoints includes all numbers subsumed within the recited ranges as well as the endpoints of the range and equivalents.

Poly(Aryl Ether Sulfone) (PAES)

The polymer compositions of the present invention comprise at least one PAES.

For the purpose of the present invention, a "poly(aryl ether sulfone) (PAES)" denotes any polymer of which at least 50 mol. % of the recurring units are recurring units ($R_{PAES}$) of formula (K), the mol. % being based on the total number of moles of recurring units in the polymer:

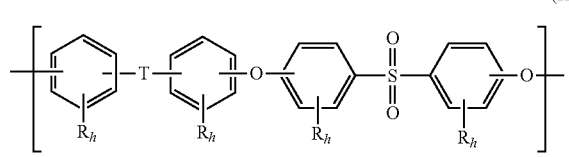

(K)

where

R, at each location, is independently selected from the group consisting of a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium;

h, for each R, is independently zero or an integer ranging from 1 to 4, and T is selected from the group consisting of a bond, a sulfone group [—S(=O)$_2$—], and a group —C(R$_j$)(R$_k$)—, where R$_j$ and R$_k$, equal to or different from each other, are selected from a hydrogen, a halogen, an alkyl, an alkenyl, an alkynyl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium.

T is preferably a bond, a sulfone group or a group —C(R$_j$)(R$_k$)— in which R$_j$ and R$_k$ are preferably methyl groups.

According to an embodiment of the present invention, at least 60 mol. % (based on the total number of moles of recurring units in the polymer), at least 70 mol. %, at least 80 mol. %, at least 90 mol. %, at least 95 mol. %, at least 99 mol. % or all of the recurring units in the PAES are recurring units ($R_{PAES}$).

The polymer composition (C1) may comprise PAES in an amount of at least 10 wt. %, for example at least 15 wt. %, at least 20 wt. %, at least 25 wt. %, at least 30 wt. %, at least 35 wt. %, or at least 40 wt. %, based on the total weight of the polymer composition (C1).

The polymer composition (C1) may comprise PAES in an amount of less than 55 wt. %, for example less than 53 wt. %, less than 51 wt. %, less than 49 wt. %, less than 47 wt. %, less than 45 wt. %, or less than 43 wt. %, based on the total weight of the polymer composition (C1).

Preferably, the polymer composition (C1) may comprise PSU in an amount ranging from 27 to 53 wt. %, for example from 30 to 50 wt. %, from 32 to 48 wt. % or from 34 to 46 wt. %, based on the total weight of the polymer composition (C1).

In one preferred embodiment, the PAES polymer is a polysulfone (PSU).

For the purpose of the present invention, a polysulfone (PSU) denotes any polymer comprising at least 50 mol. % recurring units ($R_{PSU}$) of formula (L), the mol. % being based on the total number of moles in the polymer:

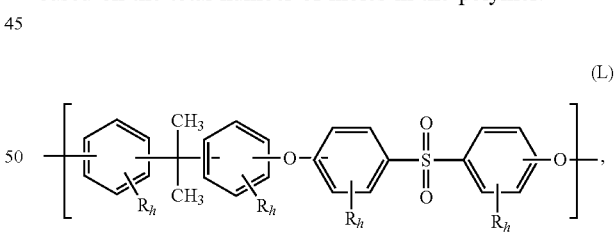

(L)

where

R, at each location, is independently selected from a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium;

h, for each R, is independently zero or an integer ranging from 1 to 4.

According to formula (L), each aromatic cycle of recurring unit ($R_{PSU}$) may contain from 1 to 4 radical groups R. When h is 0, the corresponding aromatic cycle does not contain any radical group R.

According to an embodiment, each R is, at each location in formula (L) above, independently selected from the group consisting of a C1-C12 moiety, optionally comprising one or more than one heteroatoms; sulfonic acid and sulfonate groups; phosphonic acid and phosphonate groups; amine and quaternary ammonium groups.

According to an embodiment, h is zero for each R. In other words, according to this embodiment, the recurring units ($R_{PSU}$) are units of formula (L'):

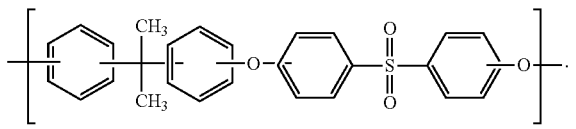

(L')

According to an embodiment of the present invention, at least 60 mol. % (based on the total number of moles of recurring units in the polymer), at least 70 mol. %, at least 80 mol. %, at least 90 mol. %, at least 95 mol. %, at least 99 mol. % or all of the recurring units in the PSU are recurring units ($R_{PSU}$) of formula (L) and/or (L').

According to another embodiment of the present disclosure, a polysulfone (PSU) denotes any polymer comprising at least 50 mol. % of the recurring units are recurring units ($R_{PSU}$) of formula (L"):

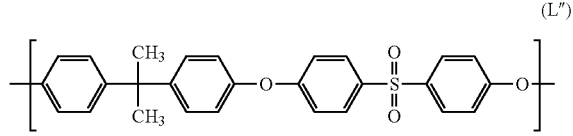

(L")

(the mol. % being based on the total number of moles of recurring units in the polymer).

According to an embodiment of the present disclosure, at least 60 mol. % (based on the total number of moles of recurring units in the polymer), at least 70 mol. %, at least 80 mol. %, at least 90 mol. %, at least 95 mol. %, at least 99 mol. % or all of the recurring units in the PSU are recurring units ($R_{PSU}$) of formula (L").

The PSU polymer of the present invention can be a homopolymer or a copolymer. If the PSU polymer is a copolymer, it can be a random, alternate or block copolymer.

When the polysulfone (PSU) is a copolymer, it can include recurring units ($R^*_{PSU}$), different from and in addition to recurring units ($R_{PSU}$), such as recurring units of formula (M), (N) and/or (O):

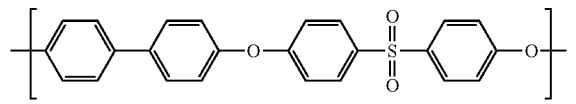

(M)

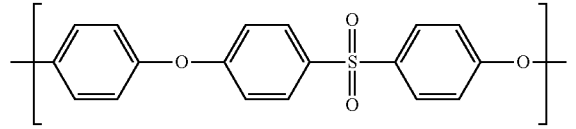

(N)

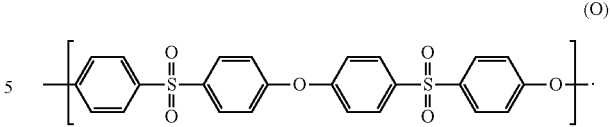

(O)

PSU is available as Udel® PSU from Solvay Specialty Polymers USA, L.L.C.

The weight average molecular weight Mw of the PSU may be from 30,000 to 80,000 g/mol, for example from 35,000 to 75,000 g/mol or from 40,000 to 70,000 g/mol.

The weight average molecular weight (Mw) of PSU can be determined by gel permeation chromatography (GPC) using methylene chloride as a mobile phase (2× 5μ mixed D columns with guard column from Agilent Technologies; flow rate: 1.5 mL/min; injection volume: 20 μL of a 0.2 w/v % sample solution), with polystyrene standards.

More precisely, the weight average molecular weight (Mw) can be measured by gel permeation chromatography (GPC), using methylene chloride as the mobile phase. In the experimental part, the following method was used: two 5μ mixed D columns with guard column from Agilent Technologies were used for separation. An ultraviolet detector of 254 nm was used to obtain the chromatogram. A flow rate of 1.5 ml/min and injection volume of 20 μL of a 0.2 w/v % solution in mobile phase was selected. Calibration was performed with 12 narrow molecular weight polystyrene standards (Peak molecular weight range: 371,000 to 580 g/mol). The weight average molecular weight (Mw) was reported.

Polysulfone polymer can be produced by a variety of methods. For example U.S. Pat. Nos. 4,108,837 and 4,175,175 describe the preparation of polyarylethers and in particular polyarylethersulfones. Several one-step and two-step processes are described in these patents, which patents are incorporated herein by reference in their entireties. In these processes, a double alkali metal salt of a dihydric phenol is reacted with a dihalobenzenoid compound in the presence of sulfone or sulfoxide solvents under substantially anhydrous conditions. In a two-step process, a dihydric phenol is first converted, in situ, in the presence of a sulfone or sulfoxide solvent to the alkali metal salt derivative by reaction with an alkali metal or an alkali metal compound. In the case of PSU manufacture, the starting monomers are bisphenol A and a 4,4'-dihalodiphenylsulfone, typically 4,4'-dichlorodiphenylsulfone. The bisphenol A is first converted to the dialkali metal salt derivative by first reacting with a base like sodium hydroxide, NaOH, in a 1:2 stoichiometric molar ratio to produce the disodium salt of bisphenol A. This disodium salt of bisphenol A is then reacted with 4,4'-dichlorodiphenylsulfone in a second step to produce the polymer. Sodium chloride salt is produced as a byproduct of the polymerization.

The polymer composition (C1) may comprise PSU in an amount of at least 25 wt. %, for example at least 27 wt. %, at least 29 wt. %, at least 31 wt. %, at least 33 wt. %, at least 35 wt. %, or at least 37 wt. %, based on the total weight of the polymer composition (C1).

The polymer composition (C1) may comprise PSU in an amount of less than 55 wt. %, for example less than 53 wt. %, less than 51 wt. %, less than 49 wt. %, less than 47 wt. %, less than 45 wt. %, or less than 43 wt. %, based on the total weight of the polymer composition (C1).

Preferably, the polymer composition (C1) may comprise PSU in an amount ranging from 27 to 53 wt. %, for example from 30 to 50 wt. %, from 32 to 48 wt. % or from 34 to 46 wt. %, based on the total weight of the polymer composition (C1).

In one other embodiment, the PAES is a polyphenylsulfone (PPSU).

As used herein, a polyphenylsulfone (PPSU) denotes any polymer comprising at least 50 mol. % recurring units ($R_{PPSU}$) of formula (M), the mol. % being based on the total number of moles of recurring units in the polymer:

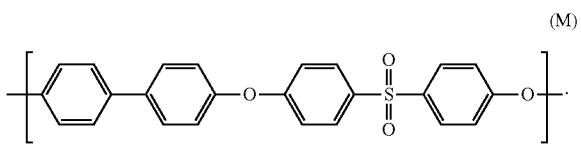

(M)

According to an embodiment of the present disclosure, at least 60 mol. % (based on the total number of moles of recurring units in the polymer), at least 70 mol. %, at least 80 mol. %, at least 90 mol. %, at least 95 mol. %, at least 99 mol. % or all of the recurring units in the PSU are recurring units ($R_{PPSU}$) of formula (M).

PPSU can be prepared by known methods and is notably available as RADEL® PPSU from Solvay Specialty Polymers USA, L.L.C.

The polymer composition (C1) comprises PPSU in an amount of at least 25 wt. %, for example at least 27 wt. %, at least 29 wt. %, at least 31 wt. %, at least 33 wt. %, at least 35 wt. %, or at least 37 wt. %, based on the total weight of the polymer composition (C1).

The polymer composition (C1) may comprise PPSU in an amount of less than 55 wt. %, for example less than 53 wt. %, less than 51 wt. %, less than 49 wt. %, less than 47 wt. %, less than 45 wt. %, or less than 43 wt. %, based on the total weight of the polymer composition (C1).

Preferably, the polymer composition (C1) may comprise PPSU in an amount ranging from 27 to 53 wt. %, for example from 30 to 50 wt. %, from 32 to 48 wt. % or from 34 to 46 wt. %, based on the total weight of the polymer composition (C1).

In one another embodiment, the PAES is a polyethersulfone (PES).

As used herein, a polyethersulfone (PES) denotes any polymer comprising at least 50 mol. % recurring units ($R_{PES}$) of formula (O), the mol. % being based on the total number of moles of recurring units in the polymer:

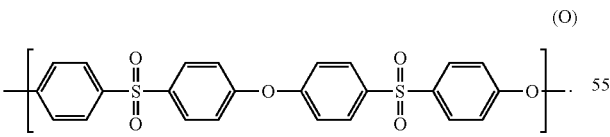

(O)

According to an embodiment of the present disclosure, at least 60 mol. % (based on the total number of moles of recurring units in the polymer), at least 70 mol. %, at least 80 mol. %, at least 90 mol. %, at least 95 mol. %, at least 99 mol. % or all of the recurring units in the PES are recurring units ($R_{PES}$) of formula (O).

PES can be prepared by known methods and is notably available as VERADEL® PESU from Solvay Specialty Polymers USA, L.L.C.

The polymer composition (C1) may comprise PES in an amount of at least 25 wt. %, for example at least 27 wt. %, at least 29 wt. %, at least 31 wt. %, at least 33 wt. %, at least 35 wt. %, or at least 37 wt. %, based on the total weight of the polymer composition (C1).

The polymer composition (C1) may comprise PES in an amount of less than 55 wt. %, for example less than 53 wt. %, less than 51 wt. %, less than 49 wt. %, less than 47 wt. %, less than 45 wt. %, or less than 43 wt. %, based on the total weight of the polymer composition (C1).

Preferably, the polymer composition (C1) may comprise PES in an amount ranging from 27 to 53 wt. %, for example from 30 to 50 wt. %, from 32 to 48 wt. % or from 34 to 46 wt. %, based on the total weight of the polymer composition (C1).

Poly(Aryl Ether Ketone) (PAEK)

The polymer compositions of the present invention comprise at least one PAEK.

As used herein, a poly(aryl ether ketone) (PAEK) denotes any polymer comprising recurring units ($R_{PAEK}$) comprising a Ar'—C(=O)—Ar* group, where Ar' and Ar*, equal to or different from each other, are aromatic groups, the mol. % being based on the total number of moles of recurring units in the polymer. The recurring units ($R_{PAEK}$) are selected from the group consisting of units of formulae (J-A) to (J-D) below:

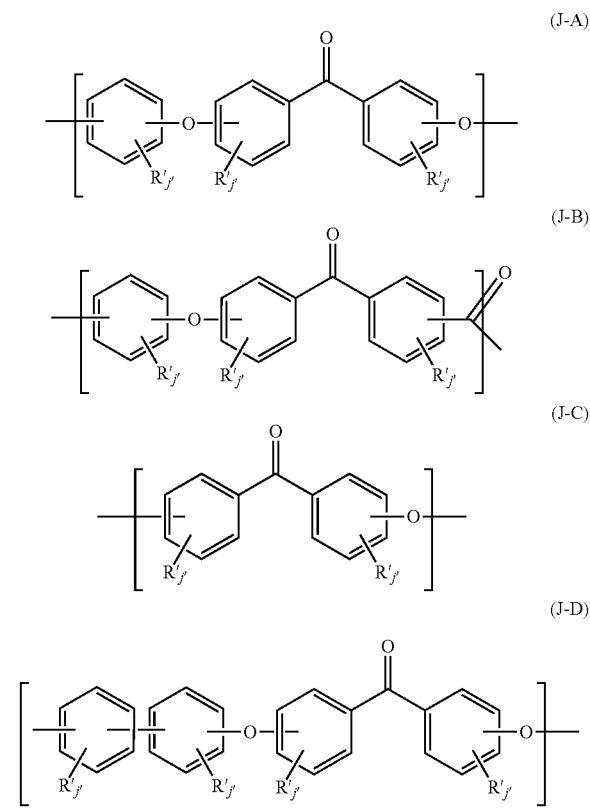

where

R', at each location, is independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and j' is independently zero or an integer ranging from 1 to 4.

In recurring unit ($R_{PAEK}$), the respective phenylene moieties may independently have 1,2-, 1,4- or 1,3-linkages to the other moieties different from R' in the recurring unit ($R_{PAEK}$). Preferably, the phenylene moieties have 1,3- or 1,4-linkages, more preferably they have a 1,4-linkage.

In recurring units ($R_{PAEK}$), j' is preferably at each location zero so that the phenylene moieties have no other substituents than those linking the main chain of the polymer.

According to an embodiment, the PAEK is a poly(ether ether ketone) (PEEK).

As used herein, a poly(ether ether ketone) (PEEK) denotes any polymer comprising recurring units ($R_{PEEK}$) of formula (J-A), based on the total number of moles of recurring units in the polymer:

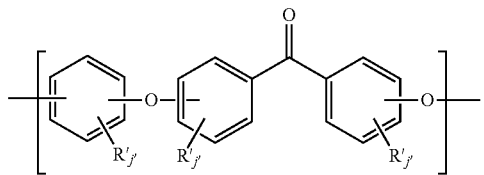

(J-A)

where

R', at each location, is independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and j', for each R', is independently zero or an integer ranging from 1 to 4 (for example 1, 2, 3 or 4).

According to formula (J-A), each aromatic cycle of the recurring unit ($R_{PEEK}$) may contain from 1 to 4 radical groups R'. When j' is 0, the corresponding aromatic cycle does not contain any radical group R'.

Each phenylene moiety of the recurring unit ($R_{PEEK}$) may, independently from one another, have a 1,2-, a 1,3- or a 1,4-linkage to the other phenylene moieties. According to an embodiment, each phenylene moiety of the recurring unit ($R_{PEEK}$), independently from one another, has a 1,3- or a 1,4-linkage to the other phenylene moieties. According to another embodiment yet, each phenylene moiety of the recurring unit ($R_{PEEK}$) has a 1,4-linkage to the other phenylene moieties.

According to an embodiment, R' is, at each location in formula (J-A) above, independently selected from the group consisting of a C1-C12 moiety, optionally comprising one or more than one heteroatoms; sulfonic acid and sulfonate groups; phosphonic acid and phosphonate groups; amine and quaternary ammonium groups.

According to an embodiment, j' is zero for each R'. In other words, according to this embodiment, the recurring units ($R_{PEEK}$) are according to formula (J'-A):

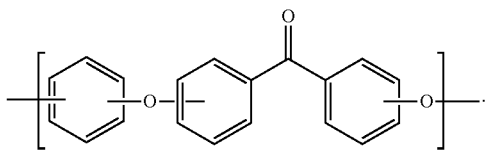

(J'-A)

According to an embodiment of the present disclosure, at least 10 mol. % (based on the total number of moles of recurring units in the polymer), at least 20 mol. %, at least 30 mol. %, at least 40 mol. %, at least 50 mol. %, at least 60 mol. %, at least 70 mol. %, at least 80 mol. %, at least 90 mol. %, at least 95 mol. %, at least 99 mol. % or all of the recurring units in the PAEK are recurring units ($R_{PEEK}$) of formulae (J-A) and/or (J'-A).

According to another embodiment of the present disclosure, a poly(ether ether ketone) (PEEK) denotes any polymer comprising at least 10 mol. % of the recurring units are recurring units ($R_{PEEK}$) of formula (J-A"):

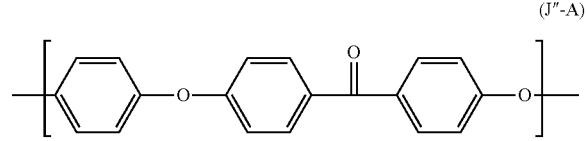

(J"-A)

the mol. % being based on the total number of moles of recurring units in the polymer.

According to an embodiment of the present disclosure, at least 10 mol. % (based on the total number of moles of recurring units in the polymer), at least 20 mol. %, at least 30 mol. %, at least 40 mol. %, at least 50 mol. %, at least 60 mol. %, at least 70 mol. %, at least 80 mol. %, at least 90 mol. %, at least 95 mol. %, at least 99 mol. % or all of the recurring units in the PEEK are recurring units ($R_{PEEK}$) of formula (J"-A).

The PEEK polymer of the present disclosure can therefore be a homopolymer or a copolymer. If the PEEK polymer is a copolymer, it can be a random, alternate or block copolymer.

When the PEEK is a copolymer, it can be made of recurring units ($R^*_{PEEK}$), different from and in addition to recurring units ($R_{PEEK}$), such as recurring units of formula (J-D):

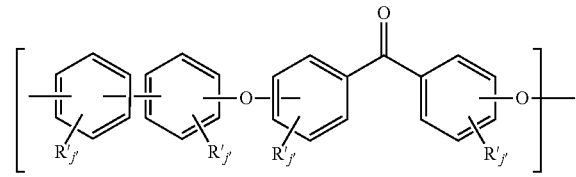

(J-D)

where

R', at each location, is independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and j', for each R', is independently zero or an integer ranging from 1 to 4.

According to formula (J-D), each aromatic cycle of the recurring unit ($R^*_{PEEK}$) may contain from 1 to 4 radical groups R'. When j' is 0, the corresponding aromatic cycle does not contain any radical group R'.

According to an embodiment, R' is, at each location in formula (J-D) above, independently selected from the group consisting of a C1-C12 moiety, optionally comprising one or more than one heteroatoms; sulfonic acid and sulfonate groups; phosphonic acid and phosphonate groups; amine and quaternary ammonium groups.

According to an embodiment, j' is zero for each R'. In other words, according to this embodiment, the recurring units (R*$_{PEEK}$) are according to formula (J'-D):

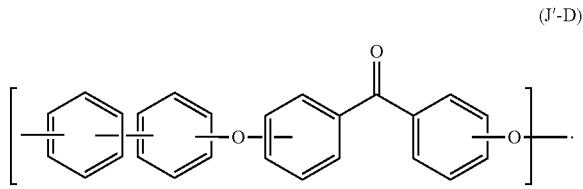

(J'-D)

According to another embodiment of the present disclosure, the recurring units (R*$_{PEEK}$) are according to formula (J"-D):

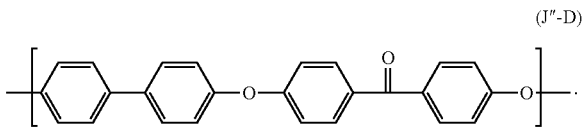

(J"-D)

According to an embodiment of the present disclosure, less than 90 mol. % (based on the total number of moles of recurring units in the polymer), less than 80 mol. %, less than 70 mol. %, less than 60 mol. %, less than 50 mol. %, less than 40 mol. %, less than 30 mol. %, less than 20 mol. %, less than 10 mol. %, less than 5 mol. %, less than 1 mol. % or all of the recurring units in the PEEK are recurring units (R*$_{PEEK}$) of formulas (J-B), (J'-B), and/or (J"-B).

According to an embodiment, the PEEK polymer is a PEEK-PEDEK copolymer. As used herein, a PEEK-PEDEK copolymer denotes a polymer comprising recurring units (R$_{PEEK}$) of formula (J-A), (J'-A) and/or (J"-A) and recurring units (R*$_{PEEK}$) of formulas (J-B), (J'-B) or (J"-B) (also called hereby recurring units (R$_{PEDEK}$)). The PEEK-PEDEK copolymer may include relative molar proportions of recurring units (R$_{PEEK}$/R$_{PEDEK}$) ranging from 95/5 to 5/95, from 90/10 to 10/90, or from 85/15 to 15/85. The sum of recurring units (R$_{PEEK}$) and (R$_{PEDEK}$) can for example represent at least 60 mol. %, 70 mol. %, 80 mol. %, 90 mol. %, 95 mol. %, 99 mol. %, of recurring units in the PEEK copolymer. The sum of recurring units (R$_{PEEK}$) and (R$_{PEDEK}$) can also represent 100 mol. %, of recurring units in the PEEK copolymer.

Defects, end groups and monomers' impurities may be incorporated in very minor amounts in the polymer (PEEK) of the present disclosure, without undesirably affecting the performance of the polymer in the polymer composition (C1).

PEEK is commercially available as KetaSpire® PEEK from Solvay Specialty Polymers USA, LLC.

PEEK can be prepared by any method known in the art. It can for example result from the condensation of 4,4'-difluorobenzophenone and hydroquinone in presence of a base. The reactor of monomer units takes place through a nucleophilic aromatic substitution. The molecular weight (for example the weight average molecular weight Mw) can be adjusting the monomers molar ratio and measuring the yield of polymerisation (e.g. measure of the torque of the impeller that stirs the reaction mixture).

According to one embodiment of the present disclosure, the PEEK polymer has a weight average molecular weight (Mw) ranging from 75,000 to 100,000 g/mol, for example from 77,000 to 98,000 g/mol, from 79,000 to 96,000 g/mol, from 81,000 to 95,000 g/mol, or from 85,000 to 94,500 g/mol (as determined by gel permeation chromatography (GPC) using phenol and trichlorobenzene (1:1) at 160° C., with polystyrene standards).

The polymer composition (C1) comprises PEEK in an amount of at least 1 wt. %, for example at least 1.5 wt. %, at least 2 wt. %, at least 2.5 wt. %, at least 3 wt. %, at least 3.5 wt. %, or at least 4 wt. %, based on the total weight of the polymer composition (C1).

The polymer composition (C1) comprises PEEK in an amount of less than 35 wt. %, for example less than 30 wt. %, less than 25 wt. %, less than 20 wt. %, less than 15 wt. %, less than 13 wt. %, or less than 11 wt. %, based on the total weight of the polymer composition (C1).

Preferably, the polymer composition (C1) comprises PEEK in an amount ranging from 1 to 15 wt. %, for example from 1.5 to 14 wt. %, from 2 to 13 wt. % or from 2.5 to 12 wt. %, based on the total weight of the polymer composition (C1).

In another embodiment, the PAEK is poly(ether ketone ketone) (PEKK).

As used herein, a poly(ether ketone ketone) (PEKK) denotes a polymer comprising more than 50 mol. % of the recurring units of formulas (J-B$_1$) and (J-B$_2$), the mol. % being based on the total number of moles of recurring units in the polymer:

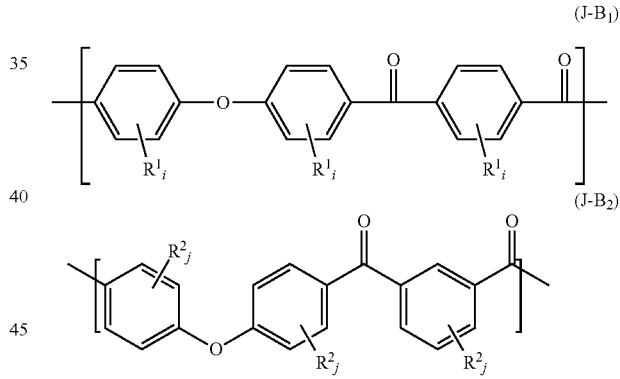

wherein

R$^1$ and R$^2$, at each instance, is independently selected from the group consisting of an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; and i and j, at each instance, is an independently selected integer ranging from 0 to 4.

According to an embodiment, R$^1$ and R$^2$ are, at each location in formula (J-B$_2$) and (J-B$_1$) above, independently selected from the group consisting of a C1-C12 moiety, optionally comprising one or more than one heteroatoms; sulfonic acid and sulfonate groups; phosphonic acid and phosphonate groups; amine and quaternary ammonium groups.

According to another embodiment, i and j are zero for each R$^1$ and R$^2$ group. According to this embodiment, the PEKK polymer comprises at least 50 mol. % of recurring units of formulas (J'-B$_1$) and (J'-B$_2$), the mol. % being based on the total number of moles of recurring units in the polymer:

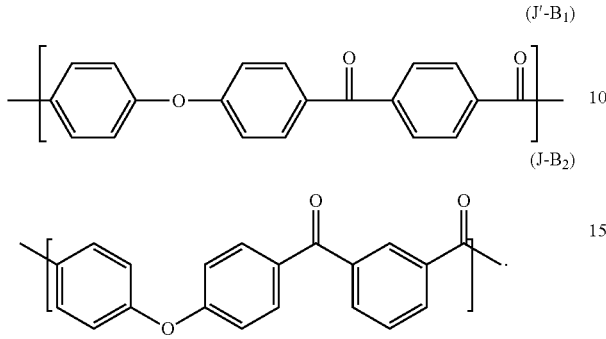

(J'-B$_1$)

(J-B$_2$)

According to an embodiment of the present disclosure, at least 55 mol. %, at least 60 mol. %, at least 70 mol. %, at least 80 mol. %, at least 90 mol. %, at least 95 mol. %, at least 99 mol. % or all of the recurring units in the PEKK are recurring units of formulae (J-B$_1$) and (J-B$_2$).

According to an embodiment of the present disclosure, in the PEKK polymer, the molar ratio of recurring units (J-B$_2$) or/and (J'-B$_2$) to recurring units (J-B$_1$) or/and (J'-B$_1$) is at least 1:1 to 5.7:1, for example at least 1.2:1 to 4:1, at least 1.4:1 to 3:1 or at least 1.4:1 to 1.86:1.

The PEKK polymer has preferably an inherent viscosity of at least 0.50 deciliters per gram (dL/g), as measured following ASTM D2857 at 30° C. on 0.5 wt./vol. % solutions in concentrated H$_2$SO$_4$ (96 wt. % minimum), for example at least 0.60 dL/g or at least 0.65 dL/g and for example at most 1.50 dL/g, at most 1.40 dL/g, or at most 1.30 dL/g.

Polyphenylene Sulfide (PPS)

The polymer composition (C1) comprises a polyphenylene sulfide polymer (PPS).

In its broadest definition, the PPS of the present invention can be made of substituted and/or unsubstituted phenylene sulfide groups.

According to the present invention, a PPS polymer denotes any polymer comprising at least 50 mol. % of recurring units (R$_{PPS}$) of formula (U) (mol. % being based on the total number of moles of recurring units in the PPS polymer):

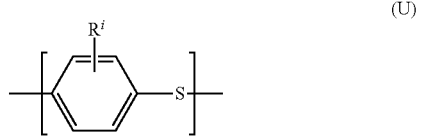

(U)

where
R is independently selected from the group consisting of halogen, C$_1$-C$_{12}$ alkyl groups, C$_7$-C$_{24}$ alkylaryl groups, C$_7$-C$_{24}$ aralkyl groups, C$_6$-C$_{24}$ arylene groups, C$_1$-C$_{12}$ alkoxy groups, and C$_6$-C$_{18}$ aryloxy groups, and
i is independently zero or an integer from 1 to 4.

According to formula (U), the aromatic cycle of the recurring unit (R$_{PPS}$) may contain from 1 to 4 radical groups R. When i is zero, the corresponding aromatic cycle does not contain any radical group R.

According to an embodiment of the present invention, the PPS polymer denotes any polymer comprising at least 50 mol. % of recurring units (R$_{PPS}$) of formula (U') where i is zero:

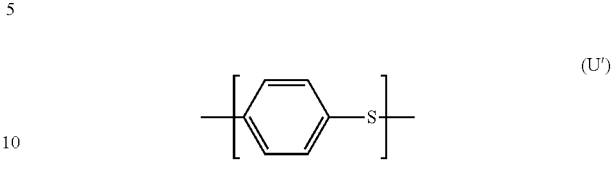

(U')

According to an embodiment of the present invention, the PPS polymer is such that at least 60 mol. %, at least 70 mol. %, at least 80 mol. %, at least 90 mol. %, at least 95 mol. %, at least 99 mol. % of the recurring units in the PPS are recurring units (R$_{PPS}$) of formula (U) or (U'). The mol. % are based are based on the total number of moles of recurring units in the PPS polymer.

According to an embodiment of the present invention, the PPS polymer is such that 100 mol. % of the recurring units are recurring units (R$_{PPS}$) of formula (U) or (U'). According to this embodiment, the PPS polymer consists essentially of recurring units (R$_{PPS}$) of formula (U) or (U').

PPS is commercially available under the tradename Ryton® PPS from Solvay Specialty Polymers USA, LLC.

The melt flow rate (at 316° C. under a weight of 5 kg according to ASTM D1238, procedure B) of the PPS may be from 50 to 400 g/10 min, for example from 60 to 300 g/10 min or from 70 to 200 g/10 min.

The polymer composition (C1) comprises PPS in an amount of at least 20 wt. %, at least 25 wt. %, at least 26 wt. %, or at least 28 wt. %, based on the total weight of the polymer composition (C1).

The polymer composition (C1) comprises PPS in an amount of less than 35 wt. %, for example less than 33 wt. %, less than 31 wt. %, less than 29 wt. %, less than 27 wt. %, less than 25 wt. %, or less than 23 wt. %, based on the total weight of the polymer composition (C1).

Preferably, the polymer composition (C1) comprises PPS in an amount ranging from 20 to 32 wt. %, for example from 21 to 30 wt. %, from 22 to 28 wt. % or from 23 to 27 wt. %, based on the total weight of the polymer composition (C1).

Glass Fibers

The polymer composition (C1) also comprises glass fibers. Glass fibers are silica-based glass compounds that contain several metal oxides which can be tailored to create different types of glass. The main oxide is silica in the form of silica sand; other oxides, such as oxides of calcium, sodium and aluminium, are incorporated to reduce the melting temperature and impede crystallization. Glass fibers may have a round cross-section or a non-circular cross-section (so called "flat glass fibers"), including oval, elliptical or rectangular. The glass fibers may be added as endless fibers or as chopped glass fibers, whereas chopped glass fibers are preferred. The glass fibers have generally a diameter of 5 to 20 μm preferably of 5 to 15 μm and more preferably of 5 to 10 μm.

According to an embodiment, the polymer composition (C1) comprises E-glass fibers.

According to an embodiment, the polymer composition (C1) comprises high modulus glass fibers having an elastic modulus (also called tensile modulus of elasticity) of at least 76, preferably at least 78, more preferably at least 80, and most preferably at least 82 GPa as measured according to ASTM D2343.

According to an embodiment, the polymer composition (C1) comprises high modulus glass fibers selected from the group consisting of R, S and T glass fibers. They are notably described in Fiberglass and Glass Technology, Wallenberger, Frederick T.; Bingham, Paul A. (Eds.), 2010, XIV. R, S and T glass fibers are composed essentially of oxides of silicon, aluminium and magnesium. In particular, R, S and T glass fibers comprise typically from 62-75 wt. % of $SiO_2$, from 16-28 wt. % of $Al_2O_3$ and from 5-14 wt. % of MgO. Additionally, R, S and T glass fibers generally comprise less than 10 wt. % of CaO.

The polymer composition (C1) comprises glass fibers in an amount of at least 5 wt. %, for example at least 10 wt. %, at least 15 wt. %, at least 20 wt. %, at least 25 wt. %, at least 26 wt. %, or at least 28 wt. %, based on the total weight of the polymer composition (C1).

The polymer composition (C1) comprises glass fibers in an amount of less than 50 wt. %, for example less than 46 wt. %, less than 42 wt. %, less than 40 wt. %, less than 38 wt. %, less than 36 wt. %, or less than 34 wt. %, based on the total weight of the polymer composition (C1).

Preferably, the polymer composition (C1) comprises glass fibers in an amount ranging from 10 to 45 wt. %, for example from 15 to 40 wt. %, from 20 to 35 wt. % or from 25 to 33 wt. %, based on the total weight of the polymer composition (C1).

Optional Ingredients

The polymer composition (C1) may further optionally comprise one or more additional additives selected from the group consisting of ultraviolet light stabilizers, heat stabilizers, acid scavengers (i.e. zinc oxide, magnesium oxide), antioxidants, pigments, processing aids, lubricants, flame retardants, and/or conductivity additive (i.e. carbon black and carbon nanofibrils).

The polymer composition (C1) may also further comprise other polymers than PSU, PEEK and PPS. In particular, the polymer composition (C1) may further comprise polymers such as poly(biphenyl ether sulfone) (PPSU), poly(ether sulfone) (PES) and/or polycarbonate (PC).

The polymer composition (C1) may further comprise flame retardants such as halogen and halogen free flame retardants.

Methods of Making the Polymer Composition (C1)

Exemplary embodiments also include methods of making the polymer composition (C1).

The polymer composition (C1) can be made by methods well known to the person of skill in the art. For example, such methods include, but are not limited to, melt-mixing processes. Melt-mixing processes are typically carried out by heating the polymer components above the melting temperature of the thermoplastic polymers thereby forming a melt of the thermoplastic polymers. In some embodiments, the processing temperature ranges from about 280-450° C., preferably from about 290-440° C., from about 300-430° C. or from about 310-420° C. Suitable melt-mixing apparatus are, for example, kneaders, Banbury mixers, single-screw extruders, and twin-screw extruders. Preferably, use is made of an extruder fitted with means for dosing all the desired components to the extruder, either to the extruder's throat or to the melt. In the process for the preparation of the part material, the components of the polymer composition, e.g. the PSU, the PEEK, the PPS, the glass fibers, and optional additives, are fed to the melt-mixing apparatus and melt-mixed in that apparatus. The components may be fed simultaneously as a powder mixture or granule mixer, also known as dry-blend, or may be fed separately.

The order of combining the components during melt-mixing is not particularly limited. In one embodiment, the component can be mixed in a single batch, such that the desired amounts of each component are added together and subsequently mixed. In other embodiments, a first sub-set of components can be initially mixed together and one or more of the remaining components can be added to the mixture for further mixing. For clarity, the total desired amount of each component does not have to be mixed as a single quantity. For example, for one or more of the components, a partial quantity can be initially added and mixed and, subsequently, some or all of the remainder can be added and mixed.

Shaped Articles and Methods of Making

Exemplary embodiments also include shaped articles comprising the above-described polymer composition and methods of making the shaped articles.

The polymer composition may be well suited for the manufacture of articles useful in a wide variety of applications. For example, the high-flow, toughness, and chemical resistance properties of the polymer composition makes it especially suitable for use in thin walled articles, structural components for mobile electronic devices (e.g., framework or housing), thermoplastic continuous fiber composites (e.g. for aeronautics and automotive structural parts), medical implants and medical devices, and shaped articles made by additive manufacturing methods as discussed below.

In some aspects, the shaped articles may be made from the polymer composition using any suitable melt-processing method such as injection molding, extrusion molding, roto-molding, or blow-molding.

Exemplary embodiments are also directed to methods of making shaped articles by additive manufacturing, where the shaped article is printed from the polymer composition. The methods include printing layers of the shaped article from the polymer composition as described below.

Additive manufacturing systems are used to print or otherwise build a shaped object from a digital representation of the shaped object by one or more additive manufacturing techniques. Examples of commercially available additive manufacturing techniques include extrusion-based techniques, selective laser sintering, powder/binder jetting, electron-beam melting, and stereolithography processes. For each of these techniques, the digital representation of the shaped object is initially sliced into multiple horizontal layers. For each layer, a tool path is then generated, which provides instructions for the particular additive manufacturing system to print the given layer.

For example, in an extrusion-based additive manufacturing system, a shaped article may be printed from a digital representation of the shaped article in a layer-by-layer manner by extruding and adjoining strips of the polymer composition. The polymer composition is extruded through an extrusion tip carried by a print head of the system, and is deposited as a sequence of roads on a platen in an x-y plane. The extruded material fuses to previously deposited material and solidifies as it cools. The position of the print head relative to the substrate is then incremented along a z-axis (perpendicular to the x-y plane), and the process is repeated to form a shaped article resembling the digital representation. An example of an extrusion-based additive manufacturing system is Fused Filament Fabrication (FFF).

As another example, in a powder-based additive manufacturing system, a laser is used to locally sinter powder into a solid part. A shaped article is created by sequentially depositing a layer of powder followed by a laser pattern to sinter an image onto that layer. An example of a powder-based additive manufacturing system is Selective Laser Sintering (SLS).

As another example, carbon-fiber composite shaped articles can be prepared using a continuous Fiber-Reinforced Thermoplastic (FRTP) printing method. This method is based on fused-deposition modeling (FDM) and prints a combination of fibers and resin.

The flowability of the polymer composition (C1) is particularly important in additive manufacturing applications where, for example, the polymer must flow readily from printing nozzles and must spread quickly and evenly to produce a uniform surface before cooling; however it is also important that the flowability needed for printing not come at the significant expense of mechanical properties of the resin in the resulting printed object. As discussed above, glass-filed polymer compositions (C1) including for example PSU, PEEK and PPS exhibit reduced melt viscosity without compromising the mechanical properties, as compared with PSU alone, or a blend of PSU and PE, making such polymer compositions particularly suitable for applications, such as, for example, structural components for mobile electronic devices, and additive manufacturing methods such as selective laser sintering (SLS) and fused filament fabrication (FFF).

Accordingly, some embodiments include a method of making a shaped article comprising printing layers of the polymer composition to form the shaped article by an extrusion-based additive manufacturing system (for example FFF), a powder-based additive manufacturing system (for example SLS), or a continuous Fiber-Reinforced Thermoplastic (FRTP) printing method.

Some embodiments include a filament including the polymer composition (C1). Preferably, the filament is suitable for use in additive manufacturing methods as described above, such as FFF.

The term "filament" refers to a thread-like object or fiber including the polymer composition. The filament may have a cylindrical or substantially cylindrical geometry, or may have a non-cylindrical geometry, such as a ribbon-shaped filament. The filament may be hollow, or may have a core-shell geometry, with a different polymer composition comprising either the core or the shell.

When the filament has a cylindrical geometry, the diameter of the cross-section of the fiber preferably ranges from 0.5 to 5 mm, preferably from 0.8 to 4 mm, preferably from 1 mm to 3.5 mm. The diameter of the filament can be chosen to feed a specific FFF 3D printer. An example of filament diameter used extensively in FFF processes is about 1.75 mm or about 2.85 mm. The filament is preferably made by extruding the polymer composition.

According to some embodiments, the polymer composition is in the form of microparticles or a powder, for example having an average diameter ranging from 1 to 200 µm, preferably from 10 to 100 µm, preferably from 20 to 80 µm as measured by electron microscopy.

Exemplary embodiments also include shaped articles made, at least in part, by the additive manufacturing methods described above using the polymer composition described above. Such shaped articles can be used in a variety of final applications such as implantable medical devices, dental prostheses, and brackets and complex shaped parts in the aerospace and automotive industries.

Flow Enhancer

According to an embodiment, PAEK and PPS are used as a flow enhancer of the polymer composition (C1) comprising at least one polysulfone (PSU) and glass fibers of the present invention. The flow enhancer is preferably a substance that effectively decreases the melt-flow viscosity of a composition at a given temperature. In the present invention, PAEK and PPS are used as flow enhancer and are provided in an amount sufficient to reduce the dynamic viscosity of the polymer composition (C1) comprising at least one polysulfone (PSU) and glass fibers. PAEK and PPS are for example provided in an amount sufficient to increase the melt flow by at least 20%, for example at least 25%, relative to the polymer composition comprising at least one polysulfone (PSU) and glass fibers. PAEK and PPS are for example provided in an amount from 6 wt. % to 55 wt. %, for example from 10 wt. % to 50 wt. %, based on the total weight of the composition.

Exemplary embodiments will now be described in the following non-limiting examples.

Should the disclosure of any patents, patent applications, and publications which are incorporated herein by reference conflict with the description of the present application to the extent that it may render a term unclear, the present description shall take precedence.

EXAMPLES

The effects on melt viscosity and mechanical properties were evaluated for various binary and ternary polymer blends.

Starting Materials

UDEL® PSU P-1700 from Solvay Specialty Polymers USA, L.L.C.

KETASPIRE® PEEK KT-880 from Solvay Specialty Polymers USA, LLC.

RYTON® PPS QA-250N from Solvay Specialty Polymers USA, LLC.

OCV 910A chopped E-fiberglass from Owens-Corning Vetrotex

General Description of the Compounding Process of the PSU/PEEK/PPS/Glass Fiber Polymer Compositions Each formulation was melt compounded using a 26 mm diameter Coperion® ZSK-26 co-rotating partially intermeshing twin screw extruder having an L/D ratio of 48:1. The barrel sections 2 through 12 and the die were heated to set point temperatures as follows: Barrels 2-6: 350° C.; Barrels 7-12: 360° C.; Die: 360° C.

In each case, the resin blends were fed at barrel section 1 using a gravimetric feeder at throughput rates in the range 30-35 lb/hr. The extruder was operated at screw speeds of around 200 RPM. Vacuum was applied at barrel zone 10 with a vacuum level of about 27 inches of mercury. A single-hole die was used for all the compounds to give a filament approximately 2.6 to 2.7 mm in diameter and the polymer filament exiting the die was cooled in water and fed to the pelletizer to generate pellets approximately 2.7 mm in length. Pellets were dried prior being injection molded.

Evaluation of Rheological and Mechanical Properties

Mechanical properties were tested for all the formulations using injection molded 0.125 in (3.2 mm) thick ASTM test specimens which consisted of Type I tensile bars. The following ASTM test methods were employed in evaluating the mechanical properties of the formulations:

Melt viscosity (350° C., 5 kg): ASTM D3835

Tensile properties: ASTM D638

Izod unnotched impact resistance (unnotched): ASTM D256

Experimental Results

TABLE 1

Ternary blend PSU/PEEK/PPS
(5 wt. % of PEEK) with Glass Fibers

|  | C1 | C2 | C3 | 1 | 2 |
|---|---|---|---|---|---|
| PSU | 70 | 65 | — | 45 | 35 |
| PEEK | — | 5 | 5 | 5 | 5 |
| PPS | — | — | 65 | 20 | 30 |
| Glass fibers | 30 | 30 | 30 | 30 | 30 |
| Melt Flow | | | | | |
| 350° C., 5 kg (g/10 min) | 10 | 8.6 | 145.6 | 25.8 | 60.4 |
| Mechanical properties | | | | | |
| Tensile Strength (MPa) | 108 | nd | 167 | 154 | 164 |
| Tensile elongation (%) | 2 | nd | 1.6 | 2.4 | 2.3 |
| Unnotched Impact resistance (J/m) | 390 | nd | 477 | 763 | 737 | nd: non determined

The addition of 5 wt. % of PEEK (C2) to glass-filled PSU leads to a decrease of the melt flow, and the mechanical properties were therefore not determined. The addition of 5 wt. % of PEEK (C3) to glass-filed PPS results in a high flow binary composition at the expense of tensile elongation, leading to a brittle compound.

The ternary compositions of examples 1 and 2 demonstrate that at the same content of PEEK, a synergistic effect is obtained and all properties including melt flow and mechanicals can be maximized.

TABLE 2

Ternary blend PSU/PEEK/PPS
(10 wt. % of PEEK) with Glass Fibers

|  | C4 | C5 | C6 | 7 | 8 |
|---|---|---|---|---|---|
| PSU | 60 | — | 50 | 40 | 30 |
| PEEK | 10 | 10 | 10 | 10 | 10 |
| PPS | — | 60 | 10 | 20 | 30 |
| Glass fibers | 30 | 30 | 30 | 30 | 30 |
| Melt Flow | | | | | |
| 350 °C., 5 kg (g/10 min) | 8.3 | Too high | 12.5 | 12.9 | 64 |
| Mechanical properties | | | | | |
| Tensile Strength (MPa) | nd | nd | 141 | 155 | 168 | nd: not determined

The addition of 10 wt. % PEEK to a glass-filed PSU (C4) leads to a too low melt flow in comparison to a glass-filed PSU (composition C1), and the mechanical properties were therefore not determined.

The addition of 10 wt. % PEEK to a glass-filed PPS (C5) leads to an increase of the melt flow in comparison to a glass-filed PSU (composition C1), and the mechanical properties were therefore not determined. The compositions of examples 7 and 8 allow for an improvement of the melt flow and at the same of the tensile strength.

The invention claimed is:

1. A polymer composition (C1) comprising:
from 25 to 59 wt. % of at least one poly(aryl ether sulfone) (PAES);
from 1 to 35 wt. % of at least one poly(aryletherketone) (PAEK);
from 20 to 35 wt. % of at least one polyphenylsulfide (PPS); and
from 5 to 50 wt. % of glass fibers,
based on the total weight of the polymer composition (C1),
wherein the PPS comprises at least about 50 mol. % of recurring units ($R_{PPS}$) of formula (U), the mol. % being based on the total number of moles of recurring units in the PPS polymer:

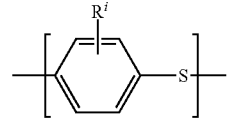

(U)

wherein
R is independently selected from the group consisting of halogen, $C_1$-$C_{12}$ alkyl groups, $C_7$-$C_{24}$ alkylaryl groups, $C_7$-$C_{24}$ aralkyl groups, $C_6$-$C_{24}$ arylene groups, $C_1$-$C_{12}$ alkoxy groups, and $C_6$-$C_{18}$ aryloxy groups, and
i is independently zero or an integer from 1 to 4.

2. The composition (C1) of claim 1, comprising from 1 to 15 wt. % of at least one PAEK, wherein the PAEK is poly(ether ether ketone) (PEEK).

3. The composition (C1) of claim 1, wherein the PAEK is a poly(ether ether ketone) (PEEK) comprising recurring units ($R_{PEEK}$) of formula (J-A), based on the total number of moles of recurring units in the polymer:

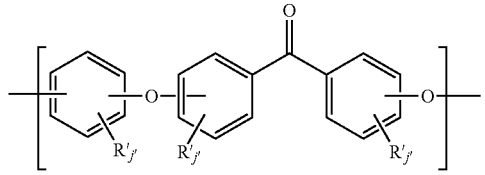

(J-A)

where
R', at each location, is independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and
j', for each R', is independently an integer ranging from 0 to 4.

4. The composition (C1) of claim 3, wherein the PEEK comprises at least 50 mol. % of recurring unites ($R_{PEEK}$) of formula (J-A).

5. The composition (C1) of claim 1, wherein the PAES is at least one polysulfone (PSU).

6. The composition (C1) of claim 5, wherein the PSU comprises at least 60 mol. % recurring units ($R_{PSU}$) of formula (L), the mol. % being based on the total number of moles in the polymer:

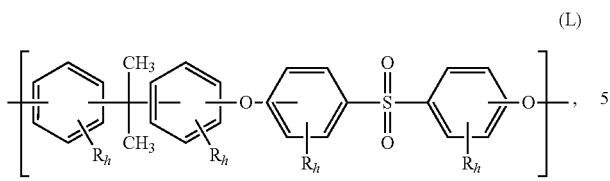

(L)

where
- R, at each location, is independently selected from the group consisting of a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; and
- h, for each R, is independently zero or an integer ranging from 1 to 4.

7. The composition (C1) of claim 1, further comprising one or more additional additives selected from the group consisting of ultraviolet light stabilizers, heat stabilizers, acid scavengers, antioxidants, pigments, processing aids, lubricants, flame retardants, and/or conductivity additive.

8. An article comprising the polymer composition according to claim 1.

9. The article of claim 8, selected from the group consisting of a pipe, a fitting, a manifold, a valve, a medical instrument or part of instrument, a medical case or tray, an aircraft interior component, a cookware, a laboratory animal cage, a laboratory equipment, and a structural part of an electronic device.

10. A method for increasing the melt flow of a polymer, comprising using a blend of at least one poly(aryl ether ketone) (PAEK) and at least one polyphenylsulfide (PPS) as a flow enhancer of a polymer composition (C2) comprising at least one poly(aryl ether sulfone) (PAES) and glass fibers, to obtain a polymer composition (C1) comprising:
- from 25 to 59 wt. % of the at least one PAES,
- from 5 to 50 wt. % of the glass fibers,
- from 1 to 35 wt. % of the at least one PAEK and
- from 20 to 35 wt. % of the at least one PPS, based on the total weight of the polymer composition (C1), wherein the PPS comprises at least about 50 mol. % of recurring units ($R_{PPS}$) of formula (U), the mol. % being based on the total number of moles of recurring units in the PPS polymer:

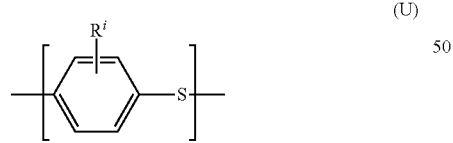

(U)

wherein
- R is independently selected from the group consisting of halogen, $C_1$-$C_{12}$ alkyl groups, $C_7$-$C_{24}$ alkylaryl groups, $C_7$-$C_{24}$ aralkyl groups, $C_6$-$C_{24}$ arylene groups, $C_1$-$C_{12}$ alkoxy groups, and $C_6$-$C_{18}$ aryloxy groups, and
- i is independently zero or an integer from 1 to 4.

11. The method of claim 10, wherein the PAES is selected from the group consisting of a polysulfone (PSU), a polyphenylsulfone (PPSU) and a polyethersulfone (PES).

12. The method of claim 10, wherein the PAEK is a poly(ether ether ketone) (PEEK).

13. The composition (C1) of claim 1, wherein i equals 0 in the recurring units ($R_{PPS}$) of formula (U).

14. The composition (C1) of claim 1, wherein the PPS comprises at least about 80 mol. % of the recurring units ($R_{PPS}$) of the formula (U) based on the total number of moles of recurring units in the PPS polymer.

15. The composition (C1) of claim 1, wherein the PPS comprises at least about 95 mol. % of the recurring units ($R_{PPS}$) of the formula (U) based on the total number of moles of recurring units in the PPS polymer.

16. The method of claim 10, wherein i equals 0 in the recurring units ($R_{PPS}$) of formula (U).

17. The method of claim 10, wherein the PPS comprises at least about 95 mol. % of the recurring units ($R_{PPS}$) of the formula (U) based on the total number of moles of recurring units in the PPS polymer.

18. The method of claim 10, wherein the PAES is at least one polysulfone (PSU), said PSU comprising at least 60 mol. % recurring units ($R_{PSU}$) of formula (L), the mol. % being based on the total number of moles in the polymer:

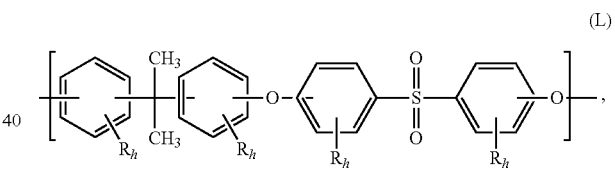

(L)

where
- R, at each location, is independently selected from the group consisting of a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; and
- h, for each R, is independently zero or an integer ranging from 1 to 4.

* * * * *